(12) United States Patent
Hooda et al.

(10) Patent No.: US 10,952,068 B2
(45) Date of Patent: Mar. 16, 2021

(54) SYSTEM AND METHOD OF FAST ROAMING IN ENTERPRISE FABRIC NETWORKS

(71) Applicant: Cisco Technology, Inc., San Jose, CA (US)

(72) Inventors: Sanjay Hooda, Pleasanton, CA (US); Vrushali Ashtaputre, San Jose, CA (US); Sudhir Jain, Fremont, CA (US); Johnson Leong, Sunnyvale, CA (US); Shree Murthy, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 16/779,903

(22) Filed: Feb. 3, 2020

(65) Prior Publication Data

US 2020/0169872 A1 May 28, 2020

Related U.S. Application Data

(63) Continuation of application No. 16/273,436, filed on Feb. 12, 2019, now Pat. No. 10,555,167, which is a continuation of application No. 15/660,247, filed on Jul. 26, 2017, now Pat. No. 10,212,583.

(51) Int. Cl.
*H04W 8/26* (2009.01)
*H04L 12/755* (2013.01)
*H04W 8/08* (2009.01)
*H04L 12/721* (2013.01)

(52) U.S. Cl.
CPC ............ *H04W 8/26* (2013.01); *H04L 45/021* (2013.01); *H04W 8/08* (2013.01); *H04L 45/66* (2013.01)

(58) Field of Classification Search
CPC .......... H04W 8/26; H04W 8/08; H04L 45/021
USPC ...................... 370/328, 338, 310.2, 329, 331
See application file for complete search history.

(56) References Cited

U.S. PATENT DOCUMENTS

| | | | |
|---|---|---|---|
| 10,044,769 B2 | 8/2018 | Mufti et al. | |
| 10,212,583 B1* | 2/2019 | Hooda | H04L 45/021 |
| 10,555,167 B2* | 2/2020 | Hooda | H04W 8/08 |
| 10,567,344 B2* | 2/2020 | Shanks | H04L 63/0263 |
| 2005/0255848 A1 | 11/2005 | Cohen | |
| 2011/0261800 A1 | 10/2011 | You et al. | |
| 2014/0086177 A1* | 3/2014 | Adjakple | H04L 67/10 |
| | | | 370/329 |
| 2014/0107816 A1* | 4/2014 | Guedalia | G16H 20/30 |
| | | | 700/91 |

(Continued)

*Primary Examiner* — Nghi H Ly
(74) *Attorney, Agent, or Firm* — Meunier Carlin & Curfman LLC (57) ABSTRACT

A system and method for fast roaming in one or more enterprise fabric network. The fast roaming involves correlation operations performed in one or more databases managed by control plane of the fabric network to update routing locator entries associated with L2-VNID and L3-VNID in one or more databases when a client moves from behind a first switch to behind a second switch. In some embodiments, the control plane finds the L3-VNID from the L2-VNID. The L3-VNID is used to search for all IP addresses corresponding to a client-MAC. At least new routing locator value that is used in the routing locator entries is provided to the first switch, the second switch, and border nodes associated with the fabric network.

20 Claims, 7 Drawing Sheets

(56) References Cited

U.S. PATENT DOCUMENTS

2014/0244851 A1* 8/2014 Lee .................... H04L 12/4641
709/228
2014/0286337 A1    9/2014  Dolson et al.
2016/0198501 A1    7/2016  Verkaik et al.
2017/0339623 A1   11/2017  Pillay-Esnault

* cited by examiner

SYSTEM AND METHOD OF FAST ROAMING IN ENTERPRISE FABRIC NETWORKS

CROSS-REFERENCE TO RELATED APPLICATION

This is a continuation application of U.S. patent application Ser. No. 16/273,436, filed Feb. 12, 2019, now U.S. Pat. No. 10,555,167, which is continuation application of U.S. application Ser. No. 15/660,247, filed Jul. 26, 2017, now U.S. Pat. No. 10,212,583, each of which is incorporated by reference herein in its entirety.

TECHNICAL FIELD

The disclosure generally relates to roaming in an enterprise fabric network (e.g., a LISP fabric network).

BACKGROUND

Mobility of clients (e.g., physical devices and VM hosts) can be non-trivial because of the complexities associated with todays' network.

In enterprise fabric networks, network elements (e.g., switch/router) through which clients are connected are often not the first device to discover that a client has moved or roamed within the network. For example, in wireless networks, rather than the switch/router that services a client, a controller that manages and tracks mobility of a client (e.g., a wireless LAN controller and the like) may come to know about the client mobility before other network elements (e.g., switch or router) where the client will be connected to after the move. Further, such controller may only have a partial information of the move or roam by the client—for example, the discovery may only include some, but not all, IPv4 or IPv6 addresses associated with a given client.

Further, in data center ("DC") networks, a controller that manages a virtual infrastructure (e.g., "orchestrator") may decide and know about mobility of a virtual machine ("VM") mobility before the switch where the VM will be connected after the move.

There is a benefit to make mobility of clients in Enterprise fabric networks as fast as possible.

BRIEF DESCRIPTION OF THE FIGURES

The accompanying figures, which are incorporated herein and form part of the specification, illustrate a system and method for fast roaming in enterprise fabric networks. Together with the description, the figures further serve to explain the principles of the a system and method for fast roaming in enterprise fabric networks with correlation in fabric control plane described herein and thereby enable a person skilled in the pertinent art to make and use the system and method for fast roaming in enterprise fabric networks.

DESCRIPTION OF THE EXAMPLE EMBODIMENTS

Overview

As embodied and broadly described herein, a system for fast client roaming in an enterprise network is disclosed that comprises a MAP server (e.g., a Locator/ID Separation Protocol (LISP) MAP server). The MAP server is configured to maintain and update one or more mappings (e.g., EID-to-RLOC) of endpoint identifier (EID) to routing locators (RLOC) in one or more databases (e.g., that is internal or external to the MAP server). The MAP server is further configured to correlate information it receives about a roam or move (of a client) with information in its database to generate updates to network elements in a fabric network for fast mobility.

In some embodiments, the Map server is configured, in a roaming event, to update the one or more database by correlating (e.g., at the one or more database of the MAP server) the client-MAC address (or associated parameters such as L2-VNID) carried in a packet or frame received from a new network node to which the client has roamed onto is used to find all associated Virtual Network Identifiers (e.g., L2-VNID and L3-VNID, also referred to as L2-VNI and L3-VNI) and updating the found VNID entries with a new routing location (RLOC) identifier associated with the new network node to which the client has roamed. The packets or frames may be a reassociation packet or frame. The packets or frames may be first set of data packets sent from a VM host after being instantiated at a new location in the fabric network.

In some embodiments, the client-MAC address in the re-association frame is received, e.g., from a wireless LAN controller, and is correlated to MAC-addresses entries in the database to find the L2 Virtual Network Identifier (L2-VNID), wherein the found L2-VNID is used to find corresponding L3-VNID entries in the database. In some embodiments, the client-MAC address is derived from a packet sent after an re-orchestration event in which is a client/host is reorchestrated, e.g., by a virtual machine controller, from a first location associated with the first switch to a second location associated with the second switch.

The Map server is configured to provide the new routing locator (i.e., the RLOC identifier) to network nodes in the network, e.g., including a second switch (i.e., the new switch to which the client has roamed to), a first switch (the switch previously associated with the client prior to the roam), and other devices (e.g., border nodes). In some embodiments, the new routing locator is provided in one or more map-notify messages.

In some embodiments, a first map-notify message and a second map-notify message are sent to the first and second switches in which the first map-notify message carries the client-MAC address and an associated L2-VNID and the second map-notify message carries the client-MAC address and an associated L3-VNID. The map-notify messages, in some embodiments, cause the new switch to create a new L2-VNID binding based on the client-MAC address, and a new client IP address will be learnt from the map-notify form the MAP-server. The map-notify message, in some embodiments, also cause the previously associated switch to remove the client-MAC binding associated with a L2-VNID maintained at that associated switch. In some embodiments, an unsolicited SMR (solicited MAP request) is also sent by the MAP server to one or more border nodes, e.g., to update map-caches for the client-IP address to the new RLOC identifier.

In some embodiments, a single map-notify message is sent from the MAP server to the first and second switches (e.g., and the border node). The single map-notify message includes a first configuration for <client-MAC address, L2-EID> to new RLOC mapping (e.g., the RLOC value associated with the newly associated switch to which the client has roamed to) and a second configuration for <client-IP address, L3-EID> to the new RLOC mapping (e.g., the RLOC value associated with the new switch).

In some embodiments, the MAP server is an independent controller. In other embodiments, the MAP server is integrated in with other systems, such as the wireless LAN controller.

A method is disclosed of fast roaming a client (e.g., 100) in an enterprise fabric architecture. In some embodiments, the enterprise fabric architecture includes a wireless LAN controller (WLC), a plurality of switches including a first switch, a second switch, a border node, and a MAP-server. The method includes, in response to a client roaming from the first switch to the second switch, and the client reassociating (or reorchestrating) with the WLC through newly roamed switch (e.g., the second switch), updating in a database (e.g., a MAP server database) a current RLOC value associated with L2-VNID and L3-VNID entries corresponding to the client end-point identifier (EID) (e.g., the client MAC physical address) to a new routing locator value (e.g., RLOC) corresponding to the new switch. In some embodiments, the L2 VNID in the database is found by correlating the client MAC physical address to MAC physical address entries in the database, and the L3 VNID is found by searching through the IP addresses in the database for matches to the IP address associated with the found L2 VNID.

EXAMPLE EMBODIMENTS

Figure 1:
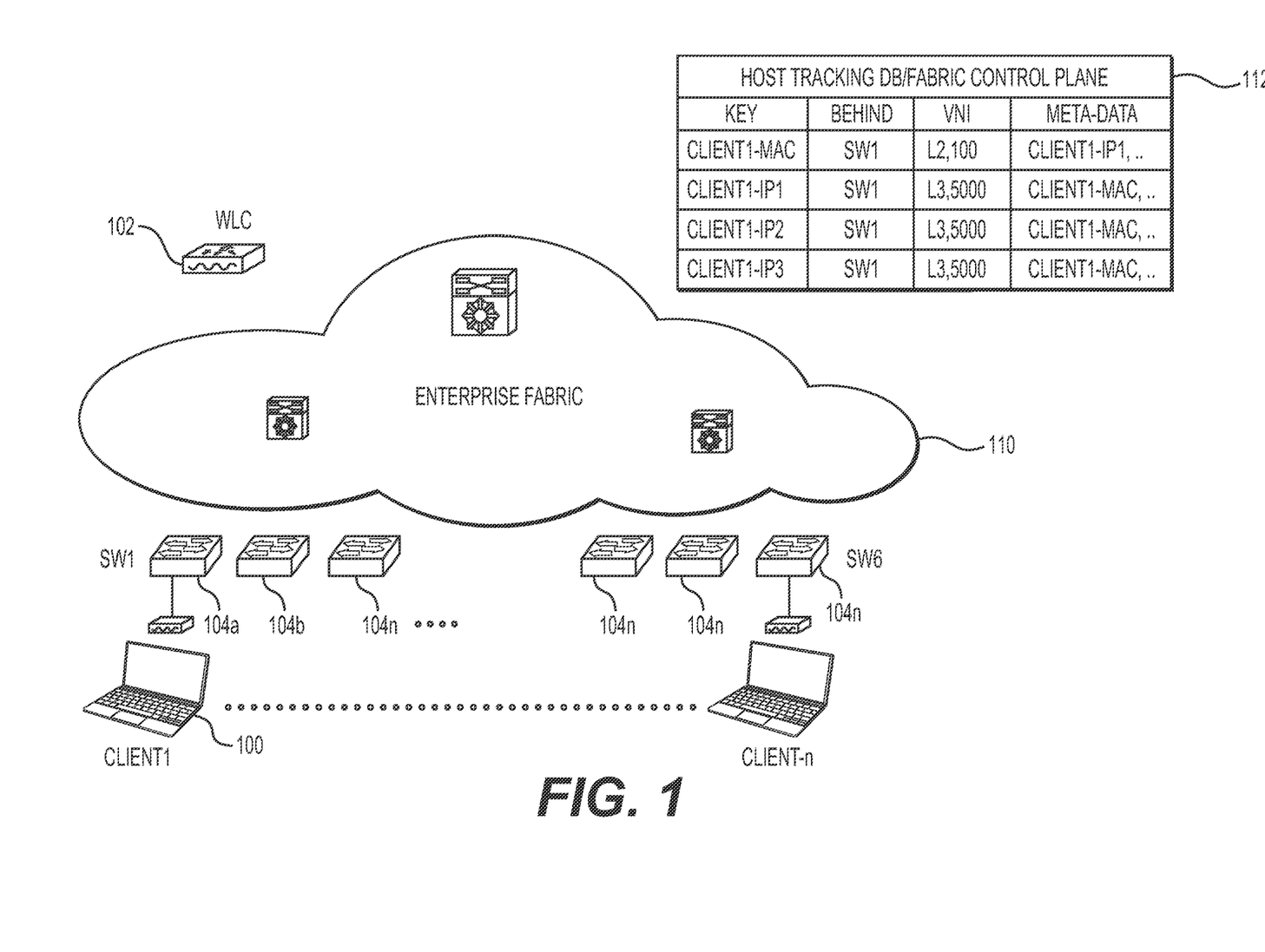
FIG. 1 illustrates an enterprise fabric architecture with a fabric control plane according to aspect of the present disclosure.

FIG. 1 illustrates an enterprise fabric 110 with an associated host tracking database 112 for a fabric control plane (e.g., a LISP control plane) associated with the tracking and control of a plurality of switches 104a . . . 104n that can service client devices 100 therein (also referred to as "hosts" and shown as "Client1" to "Client-n"). In some embodiments, the enterprise fabric 110 defines one or more networks of a data center or a campus (also referred to as a campus area network and a corporate area network). The enterprise fabric control plane (e.g., via the host tracking database 112) allows for the tracking of client-IP addresses (e.g., IPv4 and IPv6), Layer-2 Virtual Network Identifier (L2-VNID), and Layer-3 Virtual Network Identifier (L3-VNID).

As shown in FIG. 1, the host tracking database 112 includes a plurality of keys (shown as "Key") for an associated Virtual Network Identifier (shown as "VNI", though also referred to herein at "VNID"). The VNI can be associated with all L2 information (e.g., MAC physical address) or L3 information (e.g., IPv4 and/or IPv6 addresses). As shown in FIG. 1, all L2 information (shown as "CLIENT1-MAC") and L3 information (shown as "CLIENT1-IP1", "CLIENT1-IP2", and "CLIENT1-IP3") associated with a given client has an associated VNI (e.g., L2-VNI and L3-VNI). Other information may be included in the enterprise fabric control plane and host tracking database 112.

The enterprise fabric architecture 110 includes a wireless LAN controller 102 (WLC) configured to track and update connectivity and mobility of a client device in a network. In some embodiments, the wireless LAN controller 102 is configured to facilitate network deployments, operations, management. In some embodiments, the wireless LAN controller 102 allows for the configuration of wireless policies, management, and/or security settings through a centralized provisioning and management device.

Figure 2:
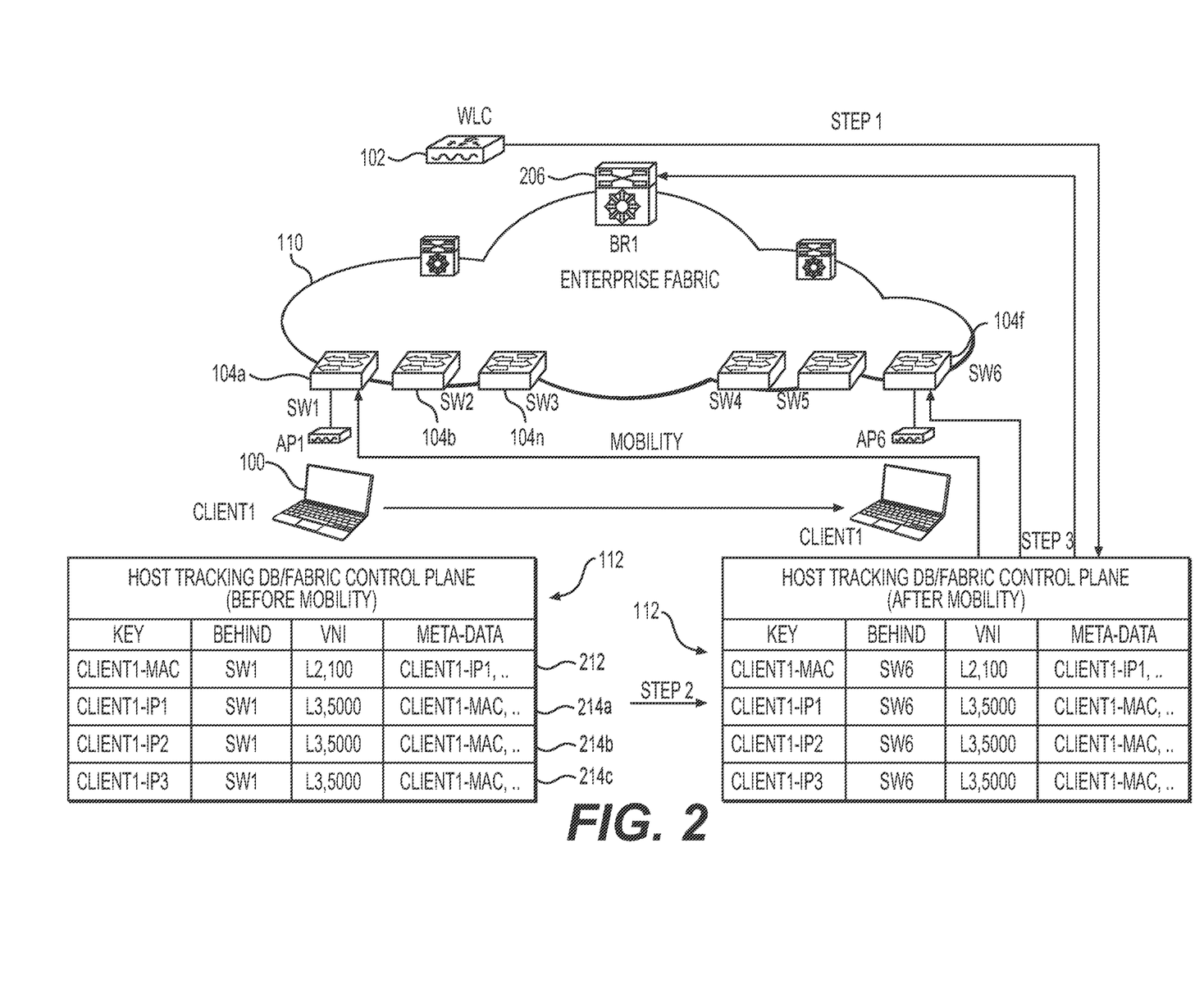
FIG. 2 illustrates entries in the enterprise fabric architecture that change when a client (e.g., a guest client) roams or moves in the enterprise network according to aspect of the present disclosure.

FIG. 2 illustrates changes to entries in the enterprise fabric control plane and host tracking database 112 when a client 100 roams or is mobile from a presently associated network element (e.g., switch) to a different network element (e.g., switch) in the network. In particular, FIG. 2 shows, changes to entries associated with all MAC physical address and IP addresses of the client 100 before the move and after the move. The entries of the host tracking database 112 can be implemented in one or across multiple databases.

Here, the speed of the change in the fabric control plane entries is increased, at least, through operations of the MAP database and/or WLC to facilitate fast roaming operations. Among other things, fast roaming beneficially, reduces, or prevent, traffic loss during a roaming event (when a client moves from a connected network element to another network element in the network). In some embodiments, the fast roaming saves critical time when mobility is involved. In some embodiments, the fast roaming avoid connection time-outs. In some embodiments, the fast roaming allows for voice and video connections to be maintained during a roaming event.

In some embodiments, the wireless LAN controller 102 updates (shown in FIG. 2, as "Step 1") the host tracking database 112 (HTDB) associated with the fabric control plane database with the mobility information, e.g., that is detected at the wireless LAN controller. In FIG. 2, the mobility information sent from the WLC 102 to the HTBD 112 includes identifier information associated with the client (such as the client's L2 information shown as "Client1-MAC"), an identifier (L3 information) associated with the new switch to which the client 100 is roamed (shown as "SW6" 1040, and a virtual network identifier (VNID) associated with the client identifier information (e.g., the associated L2-VNI; in FIG. 2 shown as L2-VNI "100"). Upon receiving the mobility information, the HTDB 112 updates (shown in FIG. 2, as "Step 2") the Client1-MAC entry (e.g., 212) associated with the L2-VNI in its database (e.g., the HTDB 112) with the new routing locator (RLOC) of the client (e.g., updating behind "SW1" to behind "SW6").

At the same time that the HTDB 212 updates (shown still in FIG. 2, as "Step 2") the L2-VNI entries associated with the Client1-MAC in its entries (e.g., the HTDB 112), the HTDB 112 also correlates (shown still in FIG. 2, as "Step 2") the L2-VNI and/or client1-MAC to other VNI identifiers by finding other Virtual Network Identifiers (e.g., L3-VNI) associated with the L2-VNI. The correlation operation finds (shown still in FIG. 2, as "Step 2") all MAC physical addresses (L2) and IP addresses (L3) associated with a given client among the different virtual network identifiers (e.g., L2-VNID(s) and L3-VNID(s)) to which traffic routing and paths for the client may be associated. This correlation of network data (e.g., L2-VNI with all L3VNI and/or MAC with associated IP address in all L3VNI) facilitates fast roaming in enterprise fabric networks, thereby allowing for faster switch handoff to facilitate one or more of the benefits discussed above.

In FIG. 2, the correlation operation at the HTBD 112 finds that L2-VNI "100" is associated with L3-VNI "5000". The HTDB 112 then searches (shown still in FIG. 2, as "Step 2") for all IP addresses (IPv4 and IPv6) associated with L3-VNI "5000" (e.g., show as 214a-214c), which are each then updated with the new routing locator (RLOC) value of the Client at e.g., identifier associated with switch "SW6". The HTDB 212, or a system associated therewith, then sends (shown in FIG. 2, as "Step 3") one or more updates (e.g., "map-notify" messages) to network elements in the enterprise fabric network (e.g., the new switch (SW6) 104f, the previously associated switch (SW1) 104a, and border nodes (e.g., "BR1" 206)) about the client move. In some embodiments, the one or more updates includes parameters such as MAC physical address(es), IP addresses, associated L2-VNID, and L3-VNID, among other information.

Figure 3:
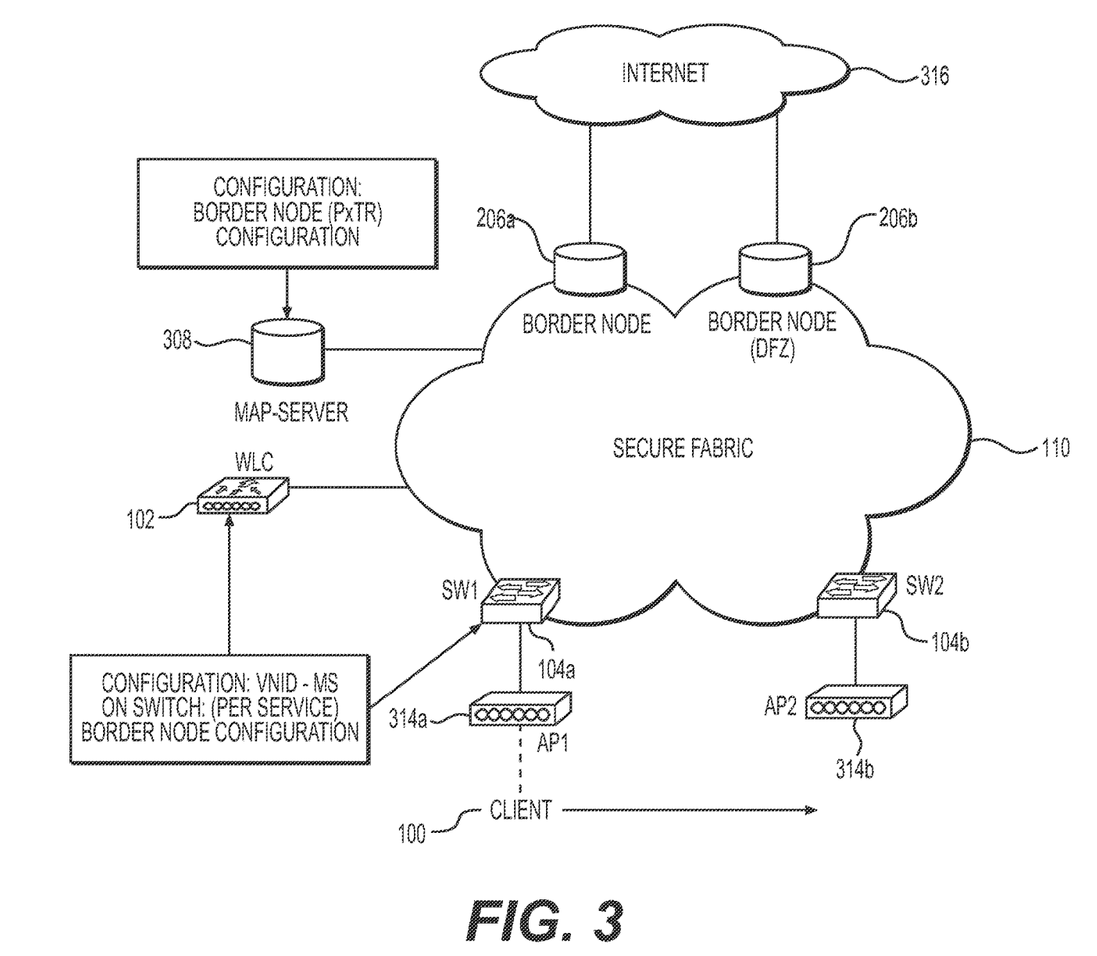
FIG. 3 illustrates a secure fabric network in which embodiments of the present disclosure may be employed according to aspect of the present disclosure.

FIG. 3 illustrates a secure fabric network in which embodiments of the present disclosure may be employed. As illustrated, the exemplary network includes a secure fabric network 110, a plurality of border nodes 206 (shown as "Border Node" 206a and "Border Node (DFZ)" 206b)), a MAP server 308 that includes the HTDB 112, a wireless LAN controller (WLC) 102, a plurality of switches 104a . . . 104n (including (SW1) 104a and (SW2) 104b), and a plurality of access points 314a . . . 314n (shown as (AP1) 314a and (AP2) 314b). As illustrated, the border nodes may connect to the Internet 316 or other networks.

As illustrated in FIG. 3, a client 100 is shown moving/roaming with respect to the access points 314a, 314b. In FIG. 3, the client 100 is initially connected to the fabric network 110 through a first access point (AP1) 314a associated with a first switch (SW1) 104a. The client 100 then roams to a different access point (AP2) 314b associated with a different switch (SW2) 104b. Although the Map server 308 and wireless LAN controller 102 are shown as separate devices, it is contemplated that, in some embodiments, they are part of a single controller.

Example Process to Join a Secure Fabric Network

Figure 4:
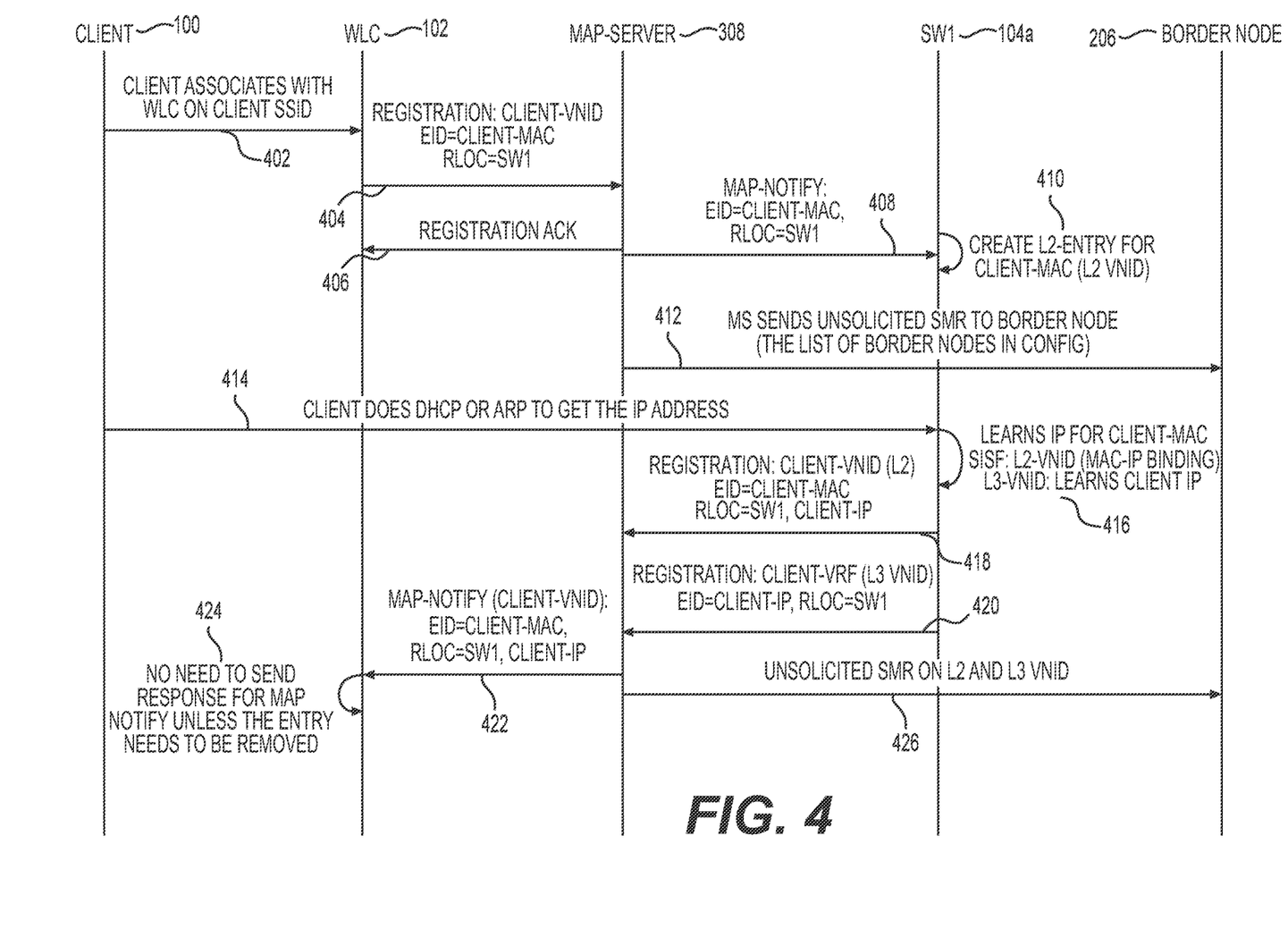
FIG. 4 illustrates an exemplary process for a client to join a network according to aspect of the present disclosure.

FIG. 4 shows an exemplary process for a client to join the network of FIG. 3, for example, via AP1 314a associated with SW1 104, to which fast roaming can be applied. As shown in FIG. 4, the client first associates (402) with a wireless LAN controller (WLC) 102 having an associated network name (e.g., Client requested SSID) and subsequently sends (414) an address resolution protocol (ARP) or Dynamic Host Configuration Protocol (DHCP) request to get an assigned IP address. Various handshake and acknowledgement frames with the client 100 and known in the art are not shown.

To associate, the client 100, in some embodiments, sends (402) a request to associate to a given SSID to an access point (AP) operatively coupled to a network switch. The request may be relayed from the access point through a switch (or other routing network elements) to a wireless LAN controller. The request may include the client MAC physical address, the network name (e.g., SSID), and, optionally, authentication information.

In response to the client's request (and typically before the client sends a ARP or DHCP request to the switch), the wireless LAN controller 102 registers (404) the client 100 with the MAP server 308 (that may maintain the host tracking database 112) and waits for an acknowledgement message (shown as "Registration ACK") of the registration. In some embodiments, during the registration, the wireless LAN controller 102 assigns an endpoint identifier (EID) for the client 100 and associates it with the client's L2 information (e.g., MAC physical address). The wireless LAN controller 102 may also assign one or more virtual network identifiers (VNID(s)). The registration message from the wireless LAN controller 102 to the Map server 308, in some embodiments, includes the endpoint identifier (e.g., client MAC physical address or other L2 identifier), the associated virtual network identifier (VNID), and the identifier of the switch through which the client 100 is currently associated (i.e., the switch through which the client 100 has joined the network).

Upon receiving the registration message, the MAP server 308 sends (406) the registration acknowledgement message to the wireless LAN controller 102 and also sends (408) a network map notification message (shown as "map-notify") to the switch through which the client 100 is associated (here, switch (SW1) 104a). The network map notification message notifies (e.g., "map-notify") of the switch 104a of the registration of the client 100 with the wireless LAN controller 102 (e.g., to permit binding of the client to the switch). In some embodiments, the switch (SW1) 304a creates (410) a layer 2 (L2) entry for the client-MAC for an associated virtual network identifier (L2-VNID). In some embodiments, the network map notification message (e.g., "map notify") includes the endpoint device identifier (EID) and the routing locator (RLOC) identifier.

In addition, and as shown in FIG. 4, the MAP server 308 sends an unsolicited SMR (solicited MAP request) to the border nodes 306 and other nodes listed in the fabric configuration. A solicited MAP request solicits a map-reply message from a given network node when there is a change in database mapping. To this end, the unsolicited SMR pushes notification of a change in database mapping to the border nodes 306. The unsolicited SMR facilitates the border nodes in directing traffic coming from outside the fabric to the client 100 through the new switch to which the client has roamed. In some embodiments, the unsolicited SMR is a bit set in a map-request message.

As shown in FIG. 4, the switch (SW1) 104a registers (410) the client 100 prior to the first address resolution protocol (ARP) or dynamic host configuration protocol (DHCP) request being received (414) thereat from the client 100. Indeed, multiple ARP and DHCP may be sent from the client to which the switch can respond. In response to the ARP or DHCP request (e.g., Ethernet ARP packet or DHCP DISCOVER message), the switch (SW1) 104a learns (416) an IP address for the client and provides (not shown) an acknowledgement message to the client with the assigned IP address. In some embodiments, the switch assigns the IP address from a list of available address.

In some embodiments, and as shown in FIG. 4, the L3 virtual network identifier (L3-VNID) is configured (416) with the L3 information (e.g., all IPv4 or IPv6 addresses). Also, a Switch Integrated Security Feature (SISF) policy associated with switch (SW1) 104a may be configured (416) with the L2 virtual network identifier (L2-VNID). The Switch Integrated Security Features (SISF), in some embodiments, take care of security, address assignment, address resolution, neighbor discovery, exit point discovery, and the like. SISF policy may be configured on both the VLAN, VXLAN, and on the physical port and is attached to a VLAN or VXLAN to learn the VLAN-specific address binding (e.g., IPv4 and IPv6 addresses on the physical port).

Following the assignment of the IP address(es) for the client, the switch (SW1) 104a registers (418, 420) both the Layer-2 VNID (e.g., the client-MAC physical address) and Layer-3 (e.g., IPv4 address and IPv6 address(es)) associated with the client 300 with the MAP server 308. The registration message(s), in some embodiments, includes the L2-VNID registration that include the client endpoint identifier (configured with the client's physical address) and a routing locator (RLOC) specifying the switch network identifier (e.g., IP address or other identifier) and associated client network address (e.g., IP address). The registration message, in some embodiments, includes a client's virtual routing and forwarding registration associated with the L3-VNID that includes the client's endpoint identifier (e.g., client IP address) and a routing locator (RLOC) specifying the switch network identifier (e.g., IP address or other identifier).

In respond to the notifications (418, 420), the WLC 102 gets (422) a notification from the MAP server 308. When the client 100 gets the IP address, the switch 104a updates the L2 EID with the client-IP, which is opaque data to the client. Upon move to the second switch 104b, the second switch 104b provides an updated the L2 EID with new client-IP, as discussed below. Also, the MAP server 308 may send (426) an unsolicited SMR to the border node 206 to allow the Locator ID Separation Protocol (LISP) to signal all the different nodes that may have a map cache to notify border nodes 206 of MAP entry change. Thus, the border nodes 206 get notification of the updated L2 and L3 entries.

Example Process to Fast Roam in a Secure Fabric Network

Figure 5:
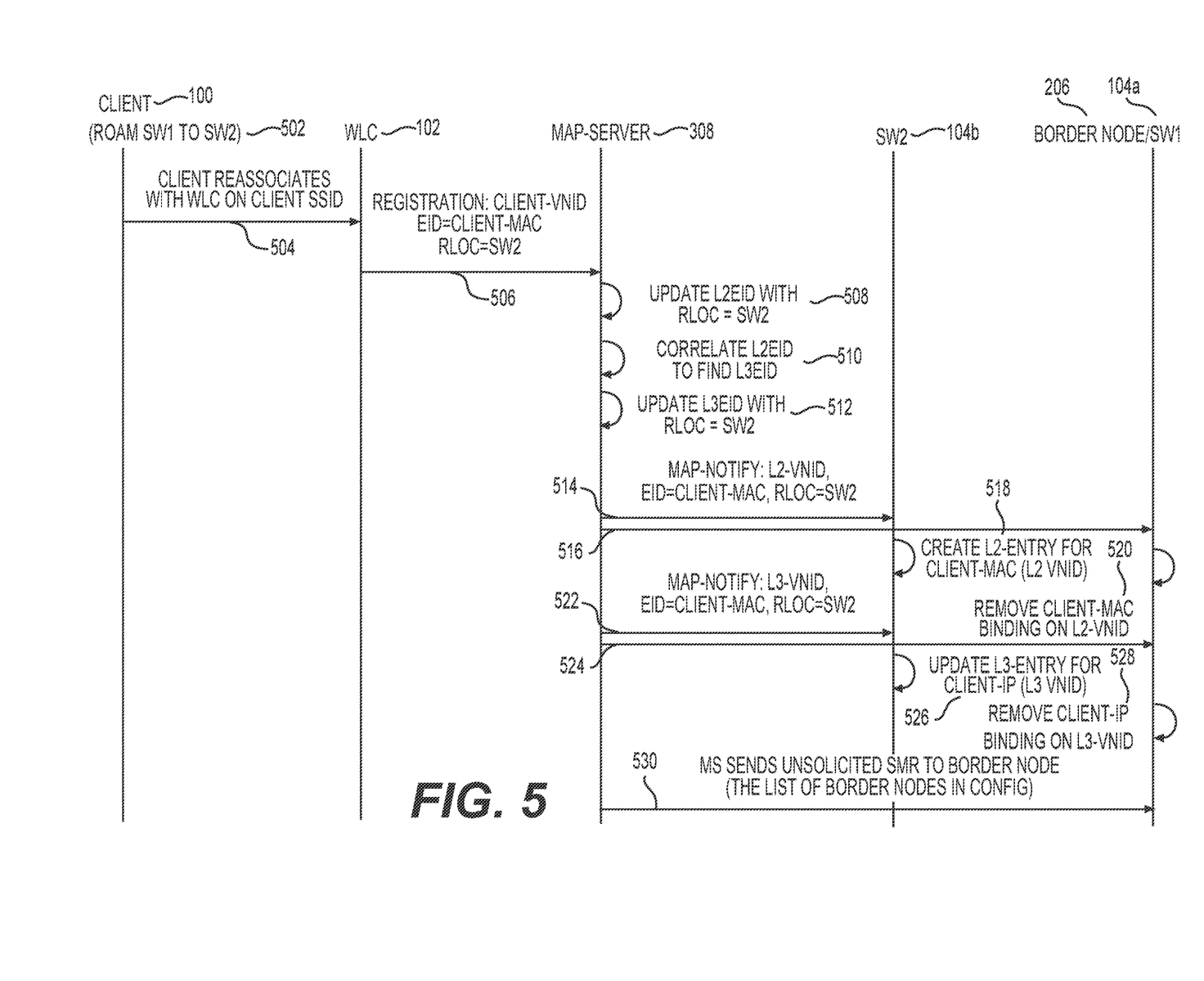
FIG. 5 illustrates an exemplary process for the client of FIG. 4 to fast roam in the network according to aspect of the present disclosure.

An exemplary flow is illustrated in the flow diagram of FIG. 5. As illustrated in FIG. 5 and with reference to the components of FIG. 3, when the client roams (502) from the first switch (SW1) 104a to the second switch (SW2) 104b, the client re-associates (504) (or re-orchestrates) with the WLC 102 through the access point (AP2) 314b, which is located behind second switch (SW2) 104b. A secure enterprise wireless LAN access point is typically configured to block all of the wireless LAN client traffic at the access point until a successful 802.1X authentication. If a client has joined a network and roams from one access point to another network the association is called a reassociation. The primary difference between an association and a reassociation is that a re-association involves the sending the basic MAC address (BSSID) of the previous access point in the reassociation request to provide roaming information to the network. A re-orchestration involves re-deployment a virtual network element from a first location associated with a first network element to a second location associated with another network element.

Referring still to FIG. 5, in response to a re-association request received through the second switch (SW2) 104b (and the access point (AP2) 314b), the WLC 102 notifies the MAP server 108 with the EID (client-mac) and RLOC (SW2) associated with L2-VNID (client VNID) via a registration message to the WLC 102. The registration message(s), in some embodiments, includes the L2-VNID registration that include the client endpoint identifier (configured with the client's physical address) and a routing locator (RLOC) specifying the switch network identifier (e.g., IP address or other identifier) and associated client network address (e.g., IPv4 and IPv6 address(es)). The WLC 102, in some embodiments, also notifies the MAP server 108 in view of a re-orchestration event detected there-at.

Referring still to FIG. 5, in response to the registration message, the MAP server 108 updates (508) the client-MAC L2 EID to the new RLOC (SW2) (e.g., as shown with entry 212 in FIG. 2). The MAP server 108 further correlates (510) the client's MAC and IP address information and updates (512) a MAP server database with the corresponding client-IP and the L3 EID with the new RLOC value ("SW2") (e.g., as shown in entries 214 in FIG. 2). The MAP server 108 sends (514, 516) network map notification messages (map-notify) to first switch (SW1) 304a and second switch (SW2) 304b. The first network map notification message (e.g., associated with 514) has the L2-VNID and carries the client's MAC address as the endpoint identifier and carries the new switch (SW2) 104b as the new routing locator identifier. The second network map notification message (e.g., associated with 516) has the L3-VNID and carries the client's MAC physical address as the endpoint identifier and carries the new switch (SW2) 104b as the new routing locator identifier.

Referring still to FIG. 5, in response to the network map notification messages (e.g., 516, 524), the first switch (SW1) 104a may examine (520) the map notify and remove (520) the client-MAC binding on L2 VNID. The first switch (SW1) 104a may also remove (528) the client-IP address binding on the L3 VNID. In some embodiments, the first switch (SW1) 304a creates an "away" entry for the client-MAC. In some embodiments, the "away" entry is made in a LISP "away" table.

Referring still to FIG. 5, in response to the network map notification messages (e.g., 514, 522), the second switch (SW2) 104b learns (518) the client-IP address from the map-notify from the MAP server 308 and creates (518) a new L2-VNID binding on the client-MAC. The second switch (SW2) 104b also updates (526) the L3 entry for the client-IP address (L3-VNID).

Referring still to FIG. 5, the MAP server 108 also sends (530) an unsolicited SMR to notify the border nodes 206 of the MAP entry changes. The border nodes 206 update the map cache for the client-IP address to point to the new RLOC, and client traffic can start to flow through the new switch (SW2) 104b to the client 100.

Another Example Process to Fast Roam in a Secure Fabric Network

Figure 6:
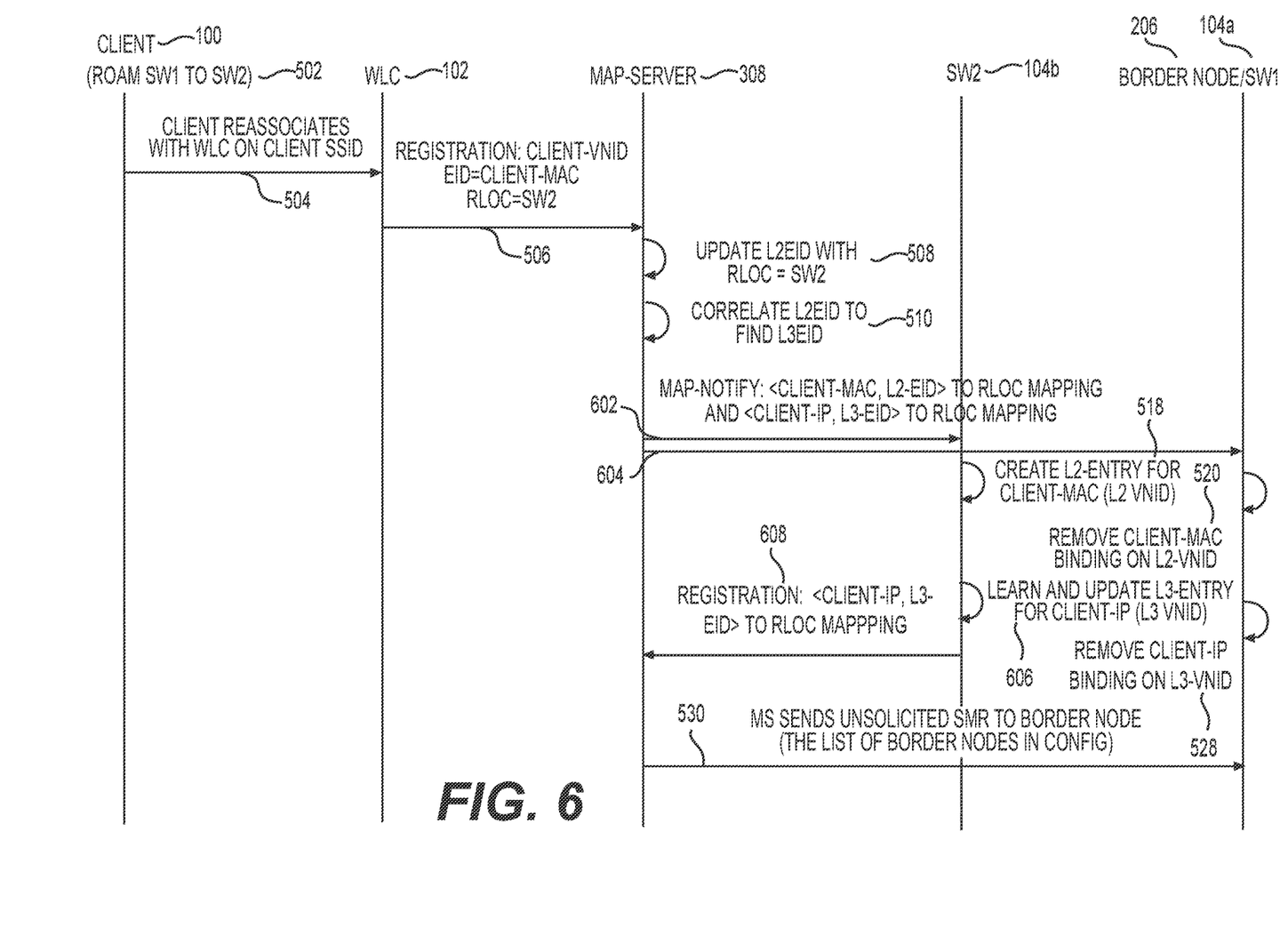
FIG. 6 illustrates an exemplary process for the client of FIG. 4 to fast roam in the network according to another aspect of the present disclosure.

FIG. 6 illustrates an exemplary process for the client of FIG. 4 to fast roam in the network according to another aspect of the present disclosure. In FIG. 6, rather than sending multiple map-notify messages as described in relation to FIG. 5, a single map-notify message is sent (602, 604) from the MAP server 308 to each of the newly associated switch (SW2) 104b, the previously associated switch (SW1) 104a, and the border nodes 206. In some embodiments, the map-notify message (associated with 602, 604) includes a <client-MAC, L2-EID> to RLOC mapping and a <client-IP, L3-EID> to RLOC mapping.

In response the map-notify message, the first switch (SW1) 104a examines the map-notify message and removes (520) client-MAC binding associated with L2-VNID and removes (528) client-IP binding associated with the L3-VNID. The first switch (SW1) 104a also creates, in some embodiments, an "away" entry for the client-MAC, e.g., in a LISP "away" table.

In response to the map-notify message, the second switch (SW2) 104b creates (518) a new L2-VNID binding for the client-MAC. The second switch (SW2) 104b also learns (526) the L3-VNID to the client-IP from a traffic received from the client 100. Further, the second switch (SW2) 104b sends (608) a registration message of <Client-IP, L3-VNID> to RLOC mapping to the Map server. In some embodiments, the registration message carries the L3-VNID to the client-IP information aggregated at the switch (SW2) 104b based on the traffic received from the client 100.

Example Process to Fast Roam in a Secure Fabric Network

Figure 7:
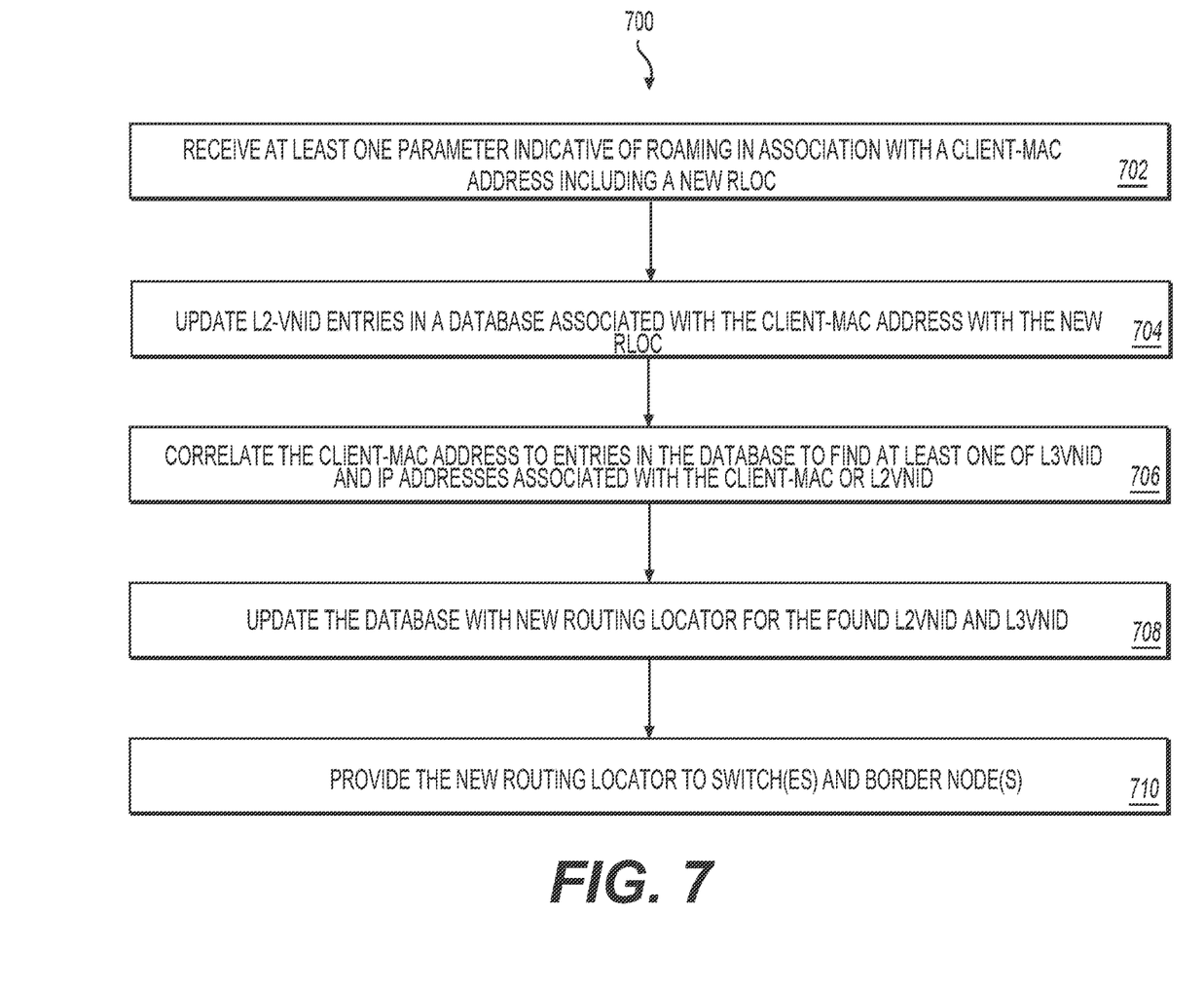
FIG. 7 provides an exemplary flow chart of client roaming according to aspect of the present disclosure.

FIG. 7 provides an exemplary flow chart 700 of client roaming according to aspect of the present disclosure.

As illustrated in FIG. 7, the control plane (e.g., that is, the aspect that is managed, e.g., by the MAP server 308) receives (702) at least one parameter indicative of roaming in association with the client-MAC address including a new routing locator (RLOC) associated with a network element (e.g., switch) to which the client has roamed or moved. In some embodiments, the parameter is derived or determined from a reassociation packet or frame (or traffic from a re-orchestrated client/host) having been notified to the wireless LAN controller and relayed to the MAP server 308. In some embodiments, the parameter is derived or determined from packets sent from a client from a re-orchestration event of a host/client in the fabric network that places the host/client in operative connection with a different network element (e.g., switch). To this end, a client has moved from behind a first switch (SW1) (e.g., 104*a*) to behind a second switch (SW2) (e.g., 104*b*). The term "behind" as used herein involves being operatively coupled directly to the network node (e.g., switch) or indirectly through other network nodes (e.g., access points). In some embodiments, the at least one parameter is selected from the group consisting of one or more IP address(es), a MAC physical address, a L2-VNID and a L3-VNID.

Referring still to FIG. 7, the process 700 includes the control plane then updating (704) L2-VNID entries in one or more database(s) (e.g. the HTDB 112) associated with the client-MAC address with the new RLOC value associated with the network element (e.g., switch) to which the client has roamed or moved.

Referring still to FIG. 7, the process 700 includes correlating (706) the client-MAC address to entries in the one or more database(s) to find at least one of L3-VNID and/or IP addresses associated with the client MAC. In some embodiments, the database (e.g. the HTDB 112) is searched for all IP addresses associated with a given virtual network identifier (e.g., L3-VNID). In some embodiments, the L2-VNID is used to find corresponding L3-VNID. In some embodiments, the correlation operation involves searching for matching values in the key field(s) of the database. In some embodiments, the correlation operation involves searching for matching values in the meta-data field(s) of the database. In some embodiments, the correlation operation involves searching entries in the database that show correlation between the L2-VNID and the L3-VNID or between client-MAC and client-IP. In some embodiments, the correlation operation (706) is performed contemporaneously with the updating operation (704) of the RLOC entry associated with the L2-VNID. In some embodiments, the correlation operation (706) is performed simultaneously with the updating operation (704) of the RLOC entry associated with the L2-VNID.

Referring to the example shown in FIG. 2, at the same time that the entry of the client-MAC address is updated, the HTDB also correlates the client1-MAC address and/or L2VNID with entries in the database to find corresponding L3VNID entries. As shown in FIG. 2, the HTDB 112 finds the L2 VNID ("100") is part of, or associated with, L3-VNID ("5000"). HTDB 112 then searches for all IP addresses associated with L3-VNID ("5000") and updates matching entries with the new routing locator (e.g., "SW6" as shown in the example of FIG. 2).

Referring back to FIG. 7, the process 700 includes, e.g., the MAP server 308 providing (710) the new routing locator information to switches (e.g. the first and second switches) and to border nodes. In some embodiments, one or more notification message(s) is send to each of the switches, e.g., a first notification message that includes L2-VNID, client EID, and the new RLOC and a second notification message that includes L3-VNID, client EID, and the new RLOC. In some embodiments, the MAP server 308 sends an unsolicited SMR message to each of the border nodes.

Updating the MAC address in a database and the correlating the client-MAC address to find the L2-VNID may performed substantially simultaneously. L2-VNID may be part of the L3-VNID. The map-notify signal may be sent to the first switch (SW1) 104*a* and the second switch (SW2) 104*b* and may include the client-MAC, L2-EID, client-IP and L3-EID. Also, one of the border nodes may update its map-cache such that an IP address associated with the client points to the new RLOC.

The MAP server may update the database with a corresponding client-IP and L3-EID entry with the new RLOC corresponding to the second switch (SW2) 104*b* based on information received by the second switch (SW2) 104*b*. It is possible for the MAP Server to learn the new RLOC for the client from a data packet received from the client.

According to an aspect of the present disclosure, the MAP server sends to the border nodes an unsolicited SMR. In addition, another aspect of the present disclosure includes creating a new L2-VNID at the second switch (SW2) 104*b* binding for a client-MAC address; and may include creating an away entry corresponding to the client-MAC address. According to principles of the present disclosure, the second switch (SW2) 104*b* may learn L3-VNID when traffic from the client is seen at the second switch (SW2) 104*b*.

According to aspects of the present disclosure, client roaming is facilitated in enterprise fabric networks by making the fabric control plane data base (HTDB) correlate the information supplied by the WLC with its own information and generate the appropriate updates for fast mobility.

In an aspect of the present disclosure, for a client in an enterprise fabric architecture (e.g., a LISP fabric architecture) having a wireless LAN controller (WLC), a first switch (SW1) 104*a*, a second switch (SW2) 104*b*, a border node (BN) and a MAP-server, the client may roam from SW1 to SW2. The client re-associates or re-establishes (via a physical or virtual roaming) with the WLC through SW2. The client-MAC L2 end-point identifier (EID) is updated to a new routing location (RLOC) corresponding to SW2. The new MAC address and IP address of the client is correlated and the MS database with corresponding client-IP, L3-EID is updated. The MAP server sends a map notify message to the first switch (SW1) 104*a* and the second switch (SW2) 104*b*. The border node updates a map-cache such that the client-IP address points to the new RLOC. The MAP server updates a database with a corresponding client-IP and L3-EID entry with the new RLOC corresponding to second switch (SW2) 104*b* based on information received by the second switch (SW2) 104*b*. The MAP server learns the new RLOC for the client from a data packet received from the client. The map-notify signal includes the client-MAC, level 2 EID, client-IP and level 3 EID. The MAP server sends to the border nodes an unsolicited SMR. The client-MAC binding on L2-VNID at SW1 is removed and an away entry corresponding to the client-MAC is created. A new L2-VNID at SW2 binding for the client-MAC may also be created. An away entry corresponding to the client-MAC may also be created. It is also contemplated that the second switch (SW2) (e.g., 104*b*) learns L3-VNID to client-IP when traffic from the client is seen at the second switch (SW2)

104*b*. The second switch (SW2) (e.g., 104*b*) may notify the map-server of RLOC mapping.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

It is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

What is claimed is:

1. A system configured for fast roaming in an enterprise network, the system comprising:
   a controller, wherein the controller is configured to, in response to receiving at least one parameter indicative of roaming in association with a client identifier, update a routing value in one or more databases with a new routing value associated with a network element to which the client has roamed, the routing value being associated with the client identifier and a virtual network identifier value for an enterprise fabric protocol;
   wherein the controller is configured to correlate the client identifier or the virtual network identifier value to entries in the one or more database to find one or more other virtual network identifier entries and to update the database with the new routing value to the found virtual network identifier entries; and
   wherein the controller is configured to send, at least, the new routing value to a first network device to which the client was previously connected prior to the roam, and a second network device to which the client is currently connected after the roam based on the correlation.

2. The system of claim 1, wherein the controller is configured to update the database with a corresponding client identifier and a VNID entry with the new routing value corresponding to the second network device based on information received from the second network device.

3. The system of claim 1, wherein the controller is configured to find and update all virtual network identifiers based on the correlation.

4. The system of claim 1, wherein the controller is configured to generate a notification message to send the new routing value to the second network device, wherein the notification message comprises the client identifier, client-MAC address, a client-IP address, and at least one of a Level-2 end-point identifier (L2-EID), a L3-EID, a VLAN associated value, a VXLAN associated value, Switch Integrated Security Feature (SISF) associated value, enterprise fabric control plane data, and hosting-tracking database data, associated with the client.

5. The system of claim 4, wherein the controller is configured to send, to the border nodes of the enterprise network, the notification message as an unsolicited SMR (solicited map server request).

6. The system of claim 1, wherein the controller is configured to provide, at least, the new routing locator to nodes or border nodes in the enterprise network.

7. The system of claim 1, wherein the controller comprises the one or more databases.

8. The system of claim 1, wherein the at least one parameter is derived from a reassociation frame received in the enterprise network.

9. The system of claim 1, wherein the at least one parameter is included in, or derived from, a packet received in the enterprise network after a virtual client has been reorchestrated from a first location associated with the first network device to a second location associated with the second network device.

10. The system of claim 1, wherein the controller is coupled to wireless LAN controller.

11. The system of claim 1, wherein the first network device is configured to update client-MAC or client-identifier binding associated with L2-VNID or L3-VNID based on a notification message that includes the new routing locator sent to the first network device.

12. The system of claim 11, wherein the first network device is configured to create an away entry for an away table based on the notification message sent to the first network device.

13. The system of claim 1, wherein the second network device is configured to create a new L2-VNID or L3-VNID binding for the client identifier based on a notification message that includes the new routing locator sent to the second network device.

14. The system of claim 13, wherein the second network device is further configured to learn one or more IP address associated with the client from the notification message sent to the second network device.

15. The system of claim 13, wherein the second network device is further configured to learn one or more IP address associated with the client from traffic received from the client.

16. The system of claim 15, wherein the second network device is configured to send a registration message to the controller to notify the controller of <client-IP, L3-VNID> to a RLOC mapping determined from the traffic received from the client.

17. The system of claim 1, wherein one or more notification message carry the new routing locator to the first network device and the second network device, the one or more notification message comprising <client identifier, L2-VNID> to RLOC mapping and/or <client identifier, L3-VNID> to RLOC mapping.

18. The system of claim 1, wherein the client comprises a virtual machine or VM host.

19. A method of roaming in an enterprise fabric architecture having a wireless LAN controller (WLC), a first network device (SW1), a second network device (SW2), a border node (BN) and a controller, the method comprising:
   when a client has roamed from the first network device to the second network device and has reassociated with the wireless LAN controller through the second switch, updating, at one or more database managed by the controller, one or more routing associated entries in the one or more database with a new routing value associated with the second network device to which the client has roamed, the new routing value entry being associated with the client identifier and a virtual network identifier value for an enterprise fabric protocol;

correlating, at the controller, the client identifier or the virtual network identifier value to entries in the one or more database to find one or more other virtual network identifier entries;

updating the one or more databases with the new routing value for each of the found virtual network identifier entries; and sending, from the controller, a notification message to the first network device and the second network device, wherein the notification message includes the new routing value.

20. A non-transitory computer readable medium for fast roaming in an enterprise network, the non-transitory computer readable medium having instructions stored thereon, wherein executed of the instructions by a processor, cause the processor to:

in response to a client having roamed from a first network device to a second network device and having re-associated with a wireless LAN controller through the second network device, update, at one or more databases, one or more routing values in the one or more database with a new routing value associated with the second network device to which the client has roamed, the being associated with a L2-VNID associated with a Media Access Control (MAC) physical address associated with the client;

correlate the client identifier or L2-VNID to find all IP address(es) associated with the client or all L3-VNID associated with the client;

update the database with a new routing location (RLOC) for each of the found IP address(es) or found L3-VNID; and send a notification message to the first network device and second network device, wherein the notification message includes the new RLOC value.

\* \* \* \* \*